Patented June 21, 1938

2,121,397

UNITED STATES PATENT OFFICE 2,121,397

STABILIZED SALTS OF HYDROSULPHUROUS ACID AND PREPARATION THEREOF

Frederick B. Downing, Carneys Point, and Charles J. Pedersen, Penns Grove, N. J., assignors to E. I. du Pont de Nemours & Company, Wilmington, Del., a corporation of Delaware No Drawing. Application September 10, 1936, Serial No. 100,218

7 Claims. (Cl. 23—243)

This invention relates to stabilized salts of hydrosulphurous acid and related hydrosulphite compounds; more particularly, it relates to anhydrous sodium hydrosulphite stabilized towards moist air by the application of a water-insoluble superposed coating of an organic film-forming substance, and still more particularly to anhydrous sodium hydrosulphite having a coating comprising a film of a resinous substance, more specifically rosin, and to processes for the production of the same.

It is an object of this invention to provide new and useful stabilized hydrosulphite compounds. It is a further object to provide new and useful salts of hydrosulphurous acid which are stable towards the free oxygen of air and towards water vapor. It is a further object to produce a stabilized alkali metal hydrosulphite compound which is not only chemically stable but which is free flowing, whose rate of solution in water at a given temperature, is substantially equal to that of the unstabilized product of the same particle size, and whose aqueous solutions are substantially equal in clarity to those of the unstabilized product. It is a still further object of this invention to provide new and useful stabilized compounds which are useful in the textile and related arts. Other objects will appear hereinafter.

These objects are accomplished by the following invention which comprises applying to the discrete particles of the dry salts of hydrosulphurous acid an enveloping superposed water-insoluble film of a film-forming organic substance, the weight of the film constituting about 0.05 to about 2% of the total weight of the product.

Sodium hydrosulphite and related hydrosulphite compounds are decomposed in at least three ways:

(1) By the action of oxidizing agents, including the free oxygen of the atmosphere, (2) By the action of water or water vapor, and (3) By the action of acids or acid salts, such as sulphurous acid and sodium bisulphate.

It has been definitely established that dry air does not cause the decomposition of sodium hydrosulphite, but that water or water vapor is required to aid the oxidation. Water, on the other hand, decomposes the salt even in the absence of free oxygen. These facts are shown by the data in the following table which were obtained experimentally.

TABLE I

The relative stability of sodium hydrosulphite EXPOSED TO DRY AND MOIST GASES AT 29°–30° C.

| Hours' exposure | Percent hydrosulphite decomposed | | | |
|---|---|---|---|---|
| | Dry nitrogen | Moist nitrogen | Dry air | Moist air |
| 0 | 0.0 | 0.0 | 0.0 | 0.0 |
| 44 | 0.0 | 52.7 | 0.0 | 74.2 |
| 116 | 0.0 | 100.0 | 0.0 | 100.0 |
| 140 | 0.0 | | 0.0 | |

Both moist nitrogen and moist air were at 75% relative humidity. The dry gases were dried by passing them slowly through two bubbling towers in series containing concentrated sulphuric acid.

The action of strong acids and acid salts in the absence of moisture has not been studied, but in the presence of moisture they have been found to accelerate the decomposition of sodium hydrosulphite by liberating hydrosulphurous acid which is less stable than the anhydrous salt.

When hydrosulphite decomposes in the presence of moist air, sulphurous acid is formed and sulphur dioxide is set free and this tends to accelerate further decomposition.

In the present discussion only free oxygen will be considered as the substance causing oxidation, water vapor as the hydrolyzing or hydrating agent, and sulphur dioxide as the acid catalyst, since they are the non-accidental factors to be contended with in the manufacture and handling of sodium hydrosulphite.

Air and moisture are not readily eliminated from a system. Sulphur dioxide occurs, in this instance, only as a consequence of the decomposition of hydrosulphite. It is evident, therefore, that the most effective way to stabilize the salt is to prevent its contact with water vapor by either moisture-proofing it or by dehumidifying the air. The former alternative is more practical because once it is accomplished moisture resistance becomes a property of the salt.

The addition of a suitable antioxidant or an anti-acid will also contribute to its stability, but these aids cannot replace protection against moisture. The same method of stabilization, therefore, cannot be used for anhydrous hydrosulphite and for aqueous hydrosulphite solutions, since in the latter it is impossible to prevent the contact of the salt with water. Hence, the suppression of acid catalysis is so important in solutions. It will be noted that, aside from compounds that combine chemically with hydrosulphite (such as formaldehyde), those that stabilize the solutions are alkaline in reaction.

A substance is most readily moisture-proofed by applying to its surface a film of moisture-resistant material. The required thickness of the coating will depend on the degree of protection desired and on the moisture-resistance and certain other physical properties of the coating material.

The demand of the chemical trade with respect to the purity of anhydrous sodium hydrosulphite has become increasingly exacting in recent years, and it is customary to deliver on a commercial scale products of better than 94% purity. This rigid requirement leaves a narrow margin within which to effect stabilization by the addition of a foreign substance to hydrosulphite.

A product consisting of, for example, 90 parts of sodium hydrosulphite, 10 parts of petrolatum and 5 to 30 parts of an emulsifying agent may be sold as a stripping agent for use under very adverse conditions, but it would always be considered a specialty product and could not be marketed in general as a sodium hydrosulphite.

It is necessary, therefore, not only to stabilize sodium hydrosulphite and other salts of hydrosulphurous acid towards moist air, but to do so without significantly decreasing its purity.

The coating may be applied by any coating method, e. g., by bathing hydrosulphite in a suitable solvent such as methanol, ethyl alcohol or chloroform, containing the required quantity of film-forming organic substance, e. g., rosin, dissolved therein and removing the solvent by evaporation. This method of stabilization may be made an independent process, in which case dry anhydrous hydrosulphite from any source may be treated; or it may be included, as a step, in the process for the manufacture of hydrosulphite, in which case it may be treated before being dried. The composition of the stabilized product, except for the amount of rosin added, will be substantially the same as that of the unstabilized hydrosulphite.

The invention will be further illustrated, but is not limited by the following examples.

Example I

Into a vacuum drier equipped with an efficient agitator are charged 1400 pounds of dry anhydrous sodium hydrosulphite and 400 pounds of methanol containing 14 pounds of commercial rosin. The charge is agitated for fifteen minutes and then dried slowly under vacuum with the agitator running. When completely dry, the product, having a coating of rosin 0.5 to 1% on the total weight, is sieved and packaged.

Other resinous substances may be substituted for the rosin of this example.

Example II

Sodium hydrosulphite crystals, after being salted-out are separated on a nutsch from the mother liquor. When all of the excess mother liquor has been removed, the crystals on the nutsch are covered with commercial ethyl alcohol containing such a quantity of rosin dissolved therein that the alcohol retained by the crystals contains 0.1% by weight of rosin on the total weight of dry sodium hydrosulphite. The wet product is charged into the vacuum drier and dried as in Example I.

Example III

As in Example II, when all the excess mother liquor has been removed by suction, hydrosulphite crystals are washed on the nutsch with commercial ethyl alcohol. The wet crystals are then charged into the vacuum drier and rosin, equal to 0.2% by weight on the weight of dry sodium hydrosulphite, dissolved in ethyl alcohol is added to the drier. The charge is agitated for thirty minutes and then gradually dried as in Example I.

The coating may be applied in any convenient manner, and the thickness of the film may be varied depending on the degree of protection desired. If a high purity of sodium hydrosulphite is not required, the weight of the coating may be increased practically indefinitely, but it must be remembered that the introduction of too much foreign substance into processes using sodium hydrosulphite might be harmful.

An important feature of the present invention is the fact that if the organic film-forming substance is present as a coating which constitutes from about 0.05% to about 2.0% by weight of the product, the product is still capable of being easily dissolved in aqueous solution although it is very stable to humid air. The thicker the coating, the more stable the product becomes depending, of course, upon the particular resinous substance used. The rate of solution is also dependent upon the amount of coating which is applied. If the product is to be used in alkaline baths, it is advantageous to use an alkali-soluble organic film-forming component.

Results showing the relative stability of treated and untreated products are given in the following tables. The tests were made at room temperature varying from 23° to 30° C. The relative humidity of air was controlled by passing it through saturated aqueous solutions of different salts, such as sodium chloride, magnesium nitrate and barium chloride.

TABLE II
*The relative stability of stabilized and unstabilized sodium hydrosulphite*
EXPOSED TO AIR AT 52% HUMIDITY

| Hours' exposure | Percent hydrosulphite decomposed | | |
| --- | --- | --- | --- |
| | Unstabilized | Stabilized 0.2% rosin | Stabilized 1.0% rosin |
| 0 | 0.0 | 0.0 | 0.0 |
| 69 | 8.4 | 3.2 | 4.2 |

TABLE III
*The relative stability of stabilized and unstabilized sodium hydrosulphite*
EXPOSED TO AIR AT 75% HUMIDITY

| Hours' exposure | Percent hydrosulphite decomposed | | |
| --- | --- | --- | --- |
| | Unstabilized | Stabilized 0.2% rosin | Stabilized 1.0% rosin |
| 0 | 0.0 | 0.0 | 0.0 |
| 3 | 5.9 | 2.8 | 1.5 |
| 23 | 42.3 | 9.0 | 8.7 |
| 27 | 52.0 | 11.7 | 10.6 |
| 49 | 70.8 | 20.1 | 21.5 |
| 128 | 100.0 | 47.3 | 45.9 |

TABLE IV

*The relative stability of stabilized and unstabilized sodium hydrosulphite*

EXPOSED TO AIR AT 88% HUMIDITY

| Hours' exposure | Percent hydrosulphite decomposed | | |
|---|---|---|---|
| | Unstabilized | Stabilized 0.2% rosin | Stabilized 1.0% rosin |
| 0 | 0.0 | 0.0 | 0.0 |
| 3 | 10.6 | 6.3 | 5.7 |
| 6 | 21.2 | 10.7 | 9.4 |
| 24 | 68.8 | 37.6 | 37.0 |
| 29 | 89.4 | 43.7 | 43.6 |

TABLE V

*The relative stability of stabilized and unstabilized sodium hydrosulphite*

EXPOSED TO AIR SATURATED WITH WATER VAPOR

| Hours' exposure | Per cent hydrosulphite decomposed | | |
|---|---|---|---|
| | Unstabilized | Stabilized 0.2% rosin | Stabilized 1.0% rosin |
| 0 | 0.0 | 0.0 | 0.0 |
| 3 | 12.6 | 7.9 | 4.8 |
| 6 | 22.8 | 13.3 | 8.2 |
| 25 | 82.8 | 52.8 | 39.2 |
| 29 | 95.5 | 61.0 | 46.4 |

The following results were obtained by exposing 300-gram samples in open beakers to the atmosphere of an ordinary plant office. The hydrosulphite was stirred twice a day during the entire period of exposure in order to permit its contact with fresh air. The atmospheric conditions were relatively favorable to the preservation of hydrosulphite as the tests were started in October and concluded in January, when the air tends to be generally dry.

TABLE VI

| Type of hydrosulphite | Days of exposure | Per cent hydrosulphite decomposed |
|---|---|---|
| Unstabilized "A" | 0 | 0.0 |
| Unstabilized "A" | 90 | 20.8 |
| Unstabilized "B" | 0 | 0.0 |
| Unstabilized "B" | 90 | 27.8 |
| Stabilized 0.1% rosin | 0 | 0.0 |
| Stabilized 0.1% rosin | 90 | 6.9 |
| Stabilized 0.2% rosin | 0 | 0.0 |
| Stabilized 0.2% rosin | 90 | 4.8 |

It is quite evident that the stability of sodium hydrosulphite is increased two to four times by the application of a surface film of rosin.

Stabilized products of over 94% purity prepared on a commercial scale can scarcely be distinguished, with respect to properties other than stability, from untreated product when dry or when used in neutral or alkaline aqueous solutions.

In place of the anhydrous sodium hydrosulphite of the examples, other hydrosulphites may be similarly stabilized. The salts of hydrosulphurous acid, in general, may be used as well as the salts of the condensation products of hydrosulphurous acid or its salts with formaldehyde or mixtures thereof known as formaldehyde sulphoxylic acid and its salts. Thus, the potassium, calcium, zinc, etc., as well as the sodium salts may be used. By the term "salt of hydrosulphurous acid" we mean to include the above specified types of compounds. The salts treated may be in any crystalline, pelleted, flaked or other solid physical forms.

In place of the rosin of the preceding examples, other natural resinous substances which form water-insoluble films may be used; for example, acid-resins composed of acid anhydrides and free acids have utility, e. g., conifer resins, copaiba balsam, zanzibar copal, dammar, sandarac, kauri, mastic, and amber, and the resinolic acids obtained therefrom, such as abietic, sylvic, pimaric, copaivic, trachylolic, dammarolic, sandaracolic, masticic and succinic-abietic acids and their anhydrides.

The ester resins, e. g., gum benzoin, balsams of Peru and Tolu, storax and aloes resin; and resene resins, e. g., myrrh, olibanum, Mecca balsam, elemi and mastic, also have utility in the present process.

The various water-insoluble solid derivatives of the above mentioned compounds, such as chlorinated derivatives and esters of the acids, may be used.

Synthetic resins as well as natural resins may be used according to the present invention. Care must be taken to insure the amount of resin used does not produce a film which is absolutely impermeable to water, however. The amount to be used varies with the resin as well as the solvent used. In general, it should be present in an amount constituting from about 0.05% to about 2.0% by weight of the product. The closely related resinous compounds, such as the cellulose derivatives, may also be used.

The above substances when further modified by hydrogenation may be used.

When the product is to be used in alkaline baths, an alkali-soluble, film-forming, resinous, organic substance presents certain advantages. Thus, alkali-soluble natural resins and synthetic resins are very useful in this relation. The resinous alkali-soluble cellulose derivatives may also be used. As examples of useful alkali-soluble resins, mention is made of the following: rosin, benzaldehyde-cresol, isosuccinic-resorcinol, phenol-aromatic acid-aldehyde, and salicylic acid-formaldehyde resins. As alkali-soluble cellulose derivatives, we give the following: methyl cellulose, ethyl cellulose, hydroxyethyl cellulose, and cellulose glycollic acid.

As solvents, mention is made of acetone, ether, chlorinated alkane hydrocarbons (viz., chloroform, carbon tetrachloride), methanol and ethanol, benzene, and petroleum hydrocarbons.

These stabilized products have the advantage that they may be used wherever the untreated material is being employed at present, as in stripping dyes from textiles and reducing dyes, and in bleaching soap, fats, sugar, and paper pulp. The products produced according to the present invention have the additional advantage that they may be used without the necessity of incorporating emulsifying agents or saponifying agents.

The atmospheric conditions prevailing in industrial buildings wherein sodium hydrosulphite is used are usually not at all suited for its preservation. High humidity, combined with elevated temperatures, tends to accelerate its decomposition if special care is not taken to protect it from contact with the atmosphere, and the routine of industry seldom includes the taking of sufficient precaution in this respect. In view of these facts, it is a distinct advantage to make available stabilized anhydrous sodium hydrosulphite whose useful life is longer even under adverse conditions of usage and storage than that of the ordinary commercial product.

As many apparently widely different embodiments of this invention may be made without departing from the spirit and scope thereof, it is to be understood that we do not limit ourselves to the specific embodiments thereof except as defined in the appended claims.

We claim:

1. Alkali metal salts of hydrosulphurous acid in the form of discrete particles having a superposed water-insoluble coating of rosin, said coating constituting about 0.05 to about 2% by weight of the product.

2. Anhydrous sodium hydrosulphite in the form of discrete crystals having a superposed coating of rosin which constitutes from about 0.05 to about 2% by weight of the product.

3. The process which comprises contacting anhydrous sodium hydrosulphite crystals with a lower aliphatic alcohol solution of rosin, and driving off the alcohol.

4. A stable free-flowing composition comprising a salt of hydrosulphurous acid which is normally unstable in the presence of air, said salt having a superposed thin coating of a natural resin, said coating constituting from about 0.05 to about 2 per cent by weight of the product.

5. A stable free-flowing composition comprising a salt of hydrosulphurous acid which is normally unstable in the presence of air, said salt having a superposed thin coating of an alkali soluble natural resin, said coating constituting from about 0.05 to about 2% by weight of the product.

6. A stable free-flowing composition of matter comprising an alkali metal salt of hydrosulphurous acid, said salt having a superposed thin coating of an alkali soluble natural resin, said coating constituting from about 0.05 to about 2% by weight of the product.

7. A stable free-flowing composition of matter comprising a salt of hydrosulphurous acid, said salt having a superposed coating of rosin, said coating constituting from about 0.05 to about 2% by weight of the product.

FREDERICK B. DOWNING.
CHARLES J. PEDERSEN.